(12) United States Patent
Naserian et al.

(10) Patent No.: US 12,236,786 B2
(45) Date of Patent: Feb. 25, 2025

(54) CALIBRATION OF TIME TO COLLISION THRESHOLD IN LOW LIGHT CONDITIONS

(71) Applicant: GM Global Technology Operations LLC, Detroit, MI (US)

(72) Inventors: Mohammad Naserian, Windsor (CA); Allan Kenneth Lewis, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 299 days.

(21) Appl. No.: 17/934,716

(22) Filed: Sep. 23, 2022

(65) Prior Publication Data

US 2024/0105058 A1    Mar. 28, 2024

(51) Int. Cl.

| | |
|---|---|
| *G08G 1/16* | (2006.01) |
| *G06T 7/90* | (2017.01) |
| *G06V 20/54* | (2022.01) |
| *G06V 20/58* | (2022.01) |
| *H04N 7/18* | (2006.01) |
| *H04N 23/71* | (2023.01) |
| *H04N 23/90* | (2023.01) |

(52) U.S. Cl.
CPC .............. *G08G 1/161* (2013.01); *G06T 7/90* (2017.01); *G06V 20/54* (2022.01); *G06V 20/58* (2022.01); *H04N 7/181* (2013.01); *H04N 23/71* (2023.01); *H04N 23/90* (2023.01); *G06T 2207/10024* (2013.01); *G06T 2207/30236* (2013.01); *G06T 2207/30261* (2013.01)

(58) Field of Classification Search
CPC .. B60W 2556/45; B60W 60/0015; G06T 7/90
See application file for complete search history.

(56) References Cited

U.S. PATENT DOCUMENTS

| | | | |
|---|---|---|---|
| 2008/0150786 A1* | 6/2008 | Breed | B60W 30/04 342/53 |
| 2021/0323541 A1* | 10/2021 | Zhu | B60W 60/0059 |
| 2022/0066456 A1* | 3/2022 | Ebrahimi Afrouzi | G06F 3/04883 |
| 2022/0070354 A1* | 3/2022 | Hardå | H04N 23/71 |

* cited by examiner

Primary Examiner — Jaime Figueroa
Assistant Examiner — Jerrod Irvin Davis
(74) Attorney, Agent, or Firm — Vivacqua Crane, PLLC

(57) ABSTRACT

A method of modifying a time to collision threshold includes receiving data and images of an object from image capturing devices and non-visual sensors within an automobile, from infrastructure cameras, and from image capturing devices within other automobiles, determining ambient light levels and color of the object, comparing ambient light levels to a pre-determined ambient light level threshold, determining a standard time to collision threshold, and sending the standard time to collision threshold to the collision avoidance system when ambient light levels are at least the pre-determined ambient light level, and, determining a standard time to collision threshold, a lighting coefficient, a color coefficient, applying the lighting and color coefficients to the standard time to collision threshold, calculating a modified time to collision threshold, sending the modified time to collision threshold to the collision avoidance system, when the ambient light levels are less than the pre-determined ambient light level threshold.

20 Claims, 2 Drawing Sheets

CALIBRATION OF TIME TO COLLISION THRESHOLD IN LOW LIGHT CONDITIONS

INTRODUCTION

The present disclosure relates to calibration of collision thresholds used by vehicle collision avoidance systems in low light conditions. Modern vehicles are equipped with advanced collision avoidance systems that are adapted to help avoid vehicle collisions. Such systems use cameras and sensors on the vehicle to detect the presence of other object that are or may become at risk for a collision. When such objects are detected, the system may provide alerts to the driver of the vehicle or take autonomous action, such as automatically applying the brakes. These systems take action when certain thresholds are met. Two important thresholds used by collision avoidance systems are Time to Collision (TTC) and Stopping Distance. These thresholds are based on optimal conditions, however, in low light conditions, particularly when an object is a dark color, a driver's ability to see, identify and react to an object are significantly affected.

Thus, while current collision avoidance systems for automobiles achieve their intended purpose, there is a need for a new and improved system and method for calibrating the time to collision threshold used by a collision avoidance system based on real-time ambient lighting conditions and the color of an object identified in the path of the automobile.

SUMMARY

According to several aspects of the present disclosure, a method of modifying a time to collision threshold within a collision avoidance system of an automobile includes receiving, with a data processor, data related to an object within a path of the automobile, and modifying a standard time to collision threshold based on the data related to the object within the path of the automobile.

According to another aspect, the receiving, with a data processor, data related to an object within a path of the automobile further includes receiving, with the data processor, via a wireless communication module, data related to an object within a path of the automobile from external image capturing devices.

According to another aspect, the external image capturing devices includes infrastructure cameras positioned along a path of the automobile.

According to another aspect, the external image capturing devices includes image capturing devices mounted within other automobiles.

According to another aspect, the receiving, with a data processor, data related to an object within a path of the automobile further includes receiving, with the data processor, via a communication bus within the automobile, data related to an object within a path of the automobile from a plurality of sensors positioned within the automobile.

According to another aspect, the plurality of sensors positioned within the automobile includes at least one image capturing device and at least one non-visual sensor.

According to another aspect, the receiving, with the data processor, data related to an object within a path of the automobile further includes receiving, with the data processor, images of the object within the path of the automobile, the method further including determining, with the data processor, ambient light levels within the images of the object, and comparing, with the data processor, the ambient light levels within the images of the object to a pre-determined ambient light level threshold, wherein, when the ambient light levels within the image of the object are at least the pre-determined ambient light level, the modifying the time to collision threshold based on the data related to the object within the path of the automobile further includes determining, with the data processor, via a first look up table within the data processor, the standard time to collision threshold, and sending, with the data processor, via a communication bus within the automobile, the standard time to collision threshold to the collision avoidance system.

According to another aspect, the receiving, with the data processor, data related to an object within a path of the automobile further includes receiving, with the data processor, images of the object within the path of the automobile, the method further including determining, with the data processor, ambient light levels within the images of the object, and comparing, with the data processor, the ambient light levels within the images of the object to a pre-determined ambient light level threshold, wherein, the modifying the time to collision threshold based on the data related to the object within the path of the automobile further includes modifying the standard time to collision threshold when the ambient light levels within the images of the object are less than the pre-determined ambient light level threshold.

According to another aspect, the modifying the time to collision threshold further includes determining, with the data processor, via a first look up table within the data processor, a standard time to collision threshold, determining, with the data processor, via a second look-up table within the data processor, a lighting coefficient, applying, with the data processor, the lighting coefficient to the standard time to collision threshold and calculating a modified time to collision threshold, and sending, with the data processor, via a communication bus within the automobile, the modified time to collision threshold to the collision avoidance system.

According to another aspect, the method further includes determining, with the data processor, a color of the object, wherein the modifying the time to collision threshold further includes determining, with the data processor, via a first look up table within the data processor, a standard time to collision threshold, determining, with the data processor, via a second look-up table within the data processor, a lighting coefficient, determining, with the data processor, via a third look-up table within the data processor, a color coefficient, applying, with the data processor, the lighting coefficient and the color coefficient to the standard time to collision threshold and calculating a modified time to collision threshold, and sending, with the data processor, via a communication bus within the automobile, the modified time to collision threshold to the collision avoidance system.

According to another aspect, the receiving, with the data processor, data related to the object within the path of the automobile, and the modifying the time to collision threshold based on the data related to the object within the path of the automobile are repeated at a pre-determined time interval.

According to several aspects of the present disclosure, a method of modifying a time to collision threshold within a collision avoidance system of an automobile includes receiving, with a data processor, via a communication bus within the automobile, data and images related to an object within a path of the automobile from at least one image capturing device and at least one non-visual sensor positioned within the automobile, receiving, with the data processor, via a wireless communication module, data and images related to an object within a path of the automobile from infrastructure cameras positioned along a path of the automobile and image capturing devices mounted within other automobiles, determining, with the data processor, ambient light levels within the images of the object, determining, with the data processor, a color of the object, comparing, with the data processor, the ambient light levels within the images of the object to a pre-determined ambient light level threshold, and, when the ambient light levels within the image of the object are at least the pre-determined ambient light level threshold, determining, with the data processor, via a first look up table, a standard time to collision threshold, and sending, with the data processor, via a communication bus within the automobile, the standard time to collision threshold to the collision avoidance system, and, when the ambient light levels within the images of the object are less than the pre-determined ambient light level threshold, determining, with the data processor, via a first look up table, a standard time to collision threshold, determining, with the data processor, via a second look-up table, a lighting coefficient, determining, with the data processor, via a third look-up table, a color coefficient, applying, with the data processor, the lighting coefficient and the color coefficient to the standard time to collision threshold and calculating a modified time to collision threshold, and sending, with the data processor, via a communication bus within the automobile, the modified time to collision threshold to the collision avoidance system.

According to several aspects of the present disclosure, a system within an automobile adapted to modify a time to collision threshold within a collision avoidance system, comprising a data processor in communication, via a communication bus, with a collision avoidance system, the data processor adapted to receive data related to an object within a path of the automobile and to modify a time to collision threshold based on the data related to the object within the path of the automobile.

According to another aspect, the system further includes a wireless communication module, the data processor further adapted to receive, via the wireless communication module, data related to an object within a path of the automobile from infrastructure cameras positioned along a path of the automobile and image capturing devices mounted within other automobiles.

According to another aspect, the system further includes at least one image capturing device and at least one non-visual sensor mounted within the automobile and in communication with the data processor via the communication bus, wherein the data processor is adapted to receive, via the communication bus, data related to an object within a path of the automobile from the at least one image capturing device and the at least one non-visual sensor.

According to another aspect, the data related to an object within a path of the automobile includes images of the object within the path of the automobile, the data processor further adapted to determine ambient light levels within the images of the object, and compare the ambient light levels within the images of the object to a pre-determined ambient light level threshold, and, when the ambient light levels within the image of the object are at least the pre-determined ambient light level threshold, the data processor is further adapted to determine, by accessing a first look up table, a standard time to collision threshold, and send, via the communication bus, the standard time to collision threshold to the collision avoidance system.

According to another aspect, the data related to an object within a path of the automobile includes images of the object within the path of the automobile, the data processor further adapted to determine ambient light levels within the images of the object, and compare the ambient light levels within the images of the object to a pre-determined ambient light level threshold, and, when the ambient light levels within the images of the object are less than the pre-determined ambient light level threshold, modify the time to collision threshold based on the data related to the object within the path of the automobile.

According to another aspect, when modifying the time to collision threshold, the data processor is further adapted to determine, by accessing a first look up table within the data processor, a standard time to collision threshold, determine, by accessing a second look-up table within the data processor, a lighting coefficient, apply the lighting coefficient to the standard time to collision threshold and calculate a modified time to collision threshold, and send, via the communication bus, the modified time to collision threshold to the collision avoidance system.

According to another aspect, the data processor is further adapted to determine a color of the object; and, when modifying the time to collision threshold, to determine, by accessing a first look up table within the data processor, a standard time to collision threshold, determine, by accessing a second look-up table within the data processor, a lighting coefficient, determine, by accessing a third look-up table within the data processor, a color coefficient, apply the lighting coefficient and the color coefficient to the standard time to collision threshold and calculate a modified time to collision threshold, and send, via the communication bus, the modified time to collision threshold to the collision avoidance system.

According to another aspect, the data processor is further adapted to receive data related to an object within a path of the automobile and to modify a time to collision threshold based on the data related to the object within the path of the automobile repeatedly at a pre-determined time interval.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
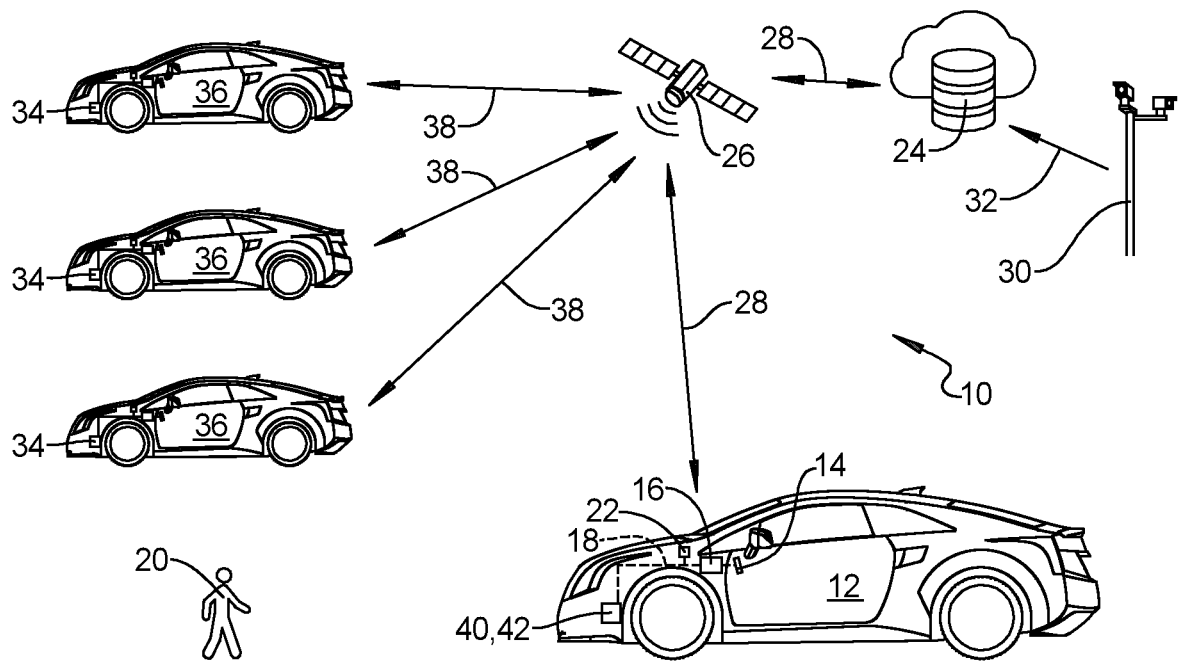
FIG. 1 is a schematic view of a system according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, a system 10 within an automobile 12 according to the present disclosure is adapted to modify a time to collision threshold within a collision avoidance system 14. A collision avoidance system (CAS), also known as a pre-crash system, forward collision warning system, or collision mitigation system, is an advanced driver-assistance system designed to prevent or reduce the severity of a collision. In its basic form, a collision avoidance system monitors a vehicle's speed, the speed of a vehicle in front of it, and the distance between the vehicles, so that the collision avoidance system can provide a warning to the driver, or take autonomous action (actuating the brakes) if the vehicles get too close, potentially helping to avoid a crash. Further, a collision avoidance system identifies objects, such as pedestrians, in the path of a vehicle and can provide a warning to the driver, or take autonomous action if the vehicle gets too close to the pedestrian at high speed, potentially helping to avoid hitting the pedestrian. The system 10 includes a data processor 16 that is in communication with the collision avoidance system 14 via a communication bus 18 within the vehicle.

The data processor 16 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The data processor 16 is adapted to receive data related to an object 20 within a path of the automobile 12 and to modify a time to collision threshold based on the data related to the object 20 within the path of the automobile 12. The object 20 may be another vehicle that is traveling in front of the automobile, or may be a pedestrian that is walking, cycling, or otherwise moving or standing within the path of the automobile 12.

The system 10 further includes a wireless communication module 22 that allows the data processor 16 to communicate wirelessly with external data sources. The wireless communication module 22 is adapted to allow wireless communication between the vehicle 12 and other vehicles or other external sources. The data processor 16 is adapted to collect information from databases 24 via a wireless data communication network 26 over wireless communication channels such as a WLAN, 4G/LTE or 5G network, or the like, as shown by arrows 28. Such databases can be communicated with directly via the internet, or may be cloud-based databases. Information that may be collected by the data processor 16 from such external sources includes, but is not limited to road and highway databases maintained by the department of transportation, a global positioning system, the internet, other vehicles via V2V communication networks, traffic information sources, vehicle-based support systems such as OnStar, etc. The data processor 16 is adapted to receive, via the wireless communication module 22 and the wireless data communication network 26, data related to an object 20 within a path of the automobile 12 from infrastructure cameras 30 positioned along a path of the automobile 12, as indicated by arrow 32, and image capturing devices 34 mounted within other automobiles 36, as indicated by arrows 38.

In an exemplary embodiment, the system 10 includes at least one image capturing device 40 and at least one non-visual sensor 42 mounted within the automobile 12 and in communication with the data processor 16 via the communication bus 18. The at least one image capturing device 40 is adapted to capture visual images of objects in the environment in front of the automobile 12. The at least one non-visual sensor 42 includes one or more sensors that are adapted to detect a position, velocity, and direction of travel of objects 20 in the environment in front of the automobile 12. By way of non-limiting examples, the at least one non-visual sensor 42 may include one or more sensors such as radar, LiDAR, and infrared sensors, however, it is to be appreciated that other sensors that employ non-visual techniques to detect the presence of objects 20 may be used as well. The data processor 16 is adapted to receive, via the communication bus 18, data related to the object 20 within the path of the automobile 12 from the at least one image capturing device 40 and the at least one non-visual sensor 42.

Time to Collision, is the time that would take a subject vehicle to collide with another vehicle that is traveling in front of the subject vehicle, or the time it would take the subject vehicle to collide with an object that is within or approaching the current path of the subject vehicle. Stopping Distance is the distance it will take to bring a subject vehicle to a complete stop from a certain speed. If a driver sees an object within the path of his/her vehicle, the time from when the driver sees the object, before reacting to it is called the perception time. There is a small delay between the moment the driver sees the object and mentally reacts to it and when the driver actually applies the brakes. This delay is also called the reaction time. After the driver applies the brakes, the car will slow down gradually, and continue to move toward the object until it comes to a complete stop. The distance travelled fro the moment the brakes are applied until the vehicle comes to a complete stop is the braking distance. The total distance travelled during the perception-reaction time added with the braking distance is the stopping distance.

A collision avoidance system within an automobile uses TTC and Stopping Distance thresholds that are developed specifically for that automobile. Such thresholds depend on factors such as weight of the vehicle (as it may vary based on number of passengers and cargo), the type of road surface, speed of the vehicle, and many other factors, and can be pulled from a look-up table stored within the collision avoidance system. These thresholds determine when the collision avoidance system will determine that a collision is imminent, and action must be taken by the collision avoidance system to alert the driver and/or take autonomous action to avoid a collision.

When lighting conditions are less than optimal, such as driving in failing light, or complete darkness without the aid of street lights, etc., a driver of a vehicle may not see an object as soon as when the lighting conditions are optimal. For instance, during daylight driving conditions, a driver may see a person crossing the street in front of their vehicle when they are 500 ft. away, but in low light conditions, the driver may not see that person until they are only 200 ft. away, giving the driver less time to react and safely avoid a collision.

Further, in low light conditions, the ability of a driver to see an object in the path of their vehicle is, at least partially, dependent upon the color of the object, or, in the case of a pedestrian, the color of the clothing that the pedestrian is wearing. For example, when driving in low light conditions, a driver of a vehicle may be able to see/identify a person who is wearing reflective clothing at 500 ft. It the person is wearing clothing that is predominately bright colored (white, yellow, etc.), the driver may be able to see/identity the person at 120-180 ft, and if the person is wearing dark colored clothing (blue, brown, black, etc.), the driver may not be able to see/identify the person until they are within 50 ft.

The data related to the object 20 within the path of the automobile 12 includes images of the object 20 within the path of the automobile 12. The data processor is adapted to determine, by examination of the images of the object 20, what the ambient light levels are at the object 20. The data processor 16 will analyze each pixel of the images, and determine the ambient light levels in terms of Lux or Lumens, or other suitable light intensity measuring standards. The data processor 16 further is adapted to compare the ambient light levels within the images of the object 20 to a pre-determined ambient light level threshold. The pre-determined ambient light level threshold is a value, pre-determined and stored within the data processor 16, above which, is considered normal or daylight conditions, and below which, is considered low light conditions.

For example, if the pre-determined ambient light level threshold is 100 lumens, and the data processor 16, after analysis, determines that the ambient light level of the images of the object 20 is 80 lumens, then the data processor will determine that the ambient light level at the object 20 is a low light condition. If the data processor 16, after analysis, determines that the ambient light level of the images of the object 20 is 110 lumens, then the data processor will determine that the ambient light level at the object 20 is normal or daylight conditions.

When the ambient light levels within the image of the object 20 are at least the pre-determined ambient light level, or daylight conditions, the data processor 16 is further adapted to determine, by accessing a first look up table, a standard time to collision threshold, and to send the standard time to collision threshold to the collision avoidance system 14. The first look up table is a table of time to collision threshold values that are pre-determined through experimentation and stored within the data processor 16.

When the ambient light levels within the image of the object 20 are less than the pre-determined ambient light level, or daylight conditions, the data processor 16 is further adapted to modify the standard time to collision threshold based on the data related to the object 20 within the path of the automobile 12.

In an exemplary embodiment, when modifying the standard time to collision threshold, the data processor 16 is further adapted to determine, by accessing the first look up table within the data processor 16, the standard time to collision threshold and to determine, by accessing a second look-up table within the data processor 16, a lighting coefficient.

Determination by the data processor 16 that the ambient lighting levels are at low light conditions, means that a driver of the automobile 12 will have more difficulty seeing an object 20 in front of the automobile 12. To accommodate for this, and give the driver of the automobile 12 more time to safely identify and react to the object 20 in front of the automobile 12, a lighting coefficient is applied to the standard time to collision threshold. The second look-up table is a table of lighting coefficient values that are pre-determined through experimentation and stored within the data processor 16. After looking up the lighting coefficient, the data processor 16 calculates a modified time to collision threshold and sends the modified time to collision threshold to the collision avoidance system 14.

For instance, if the ambient light level threshold is 100 lumens, and the data processor 16 determines that the ambient light level at the object 20 is 80 lumens, then the data processor will determine that low light levels exist. Accessing the second look-up table, based on the lighting levels (80 lumens), the second look-up table provides a lighting coefficient that is 1.2. If the standard time to collision threshold is 6 seconds, then in normal daylight conditions, the collision avoidance system 14 will take action (provide alerts or take autonomous actions) when the vehicle is 6 seconds from the object 20. If low light levels exist, the driver will need more time to see and react to the object 20, so the standard time to collision threshold is modified by multiplying the standard time to collision threshold by the lighting coefficient. Thus, the modified time to collision threshold is 1.2×6=7.2 seconds, and the collision avoidance system 14 will take action (provide alerts or take autonomous actions) when the vehicle is 7.2 seconds from the object 20. If the ambient light level threshold is 100 lumens, and the data processor 16 determines that the ambient light level at the object is 50 lumens, then the second look-up table will provide a lighting coefficient based on 50 lumens, for example 2. The even lower light conditions means that the driver will need even more time to identify and react to an object 20 in front of the automobile 12. Thus, the modified time to collision threshold when ambient lighting conditions are 50 lumens is 2×6=12 seconds, and the collision avoidance system 14 will take action (provide alerts or take autonomous actions) when the vehicle is 12 seconds from the object 20.

Figure 2:
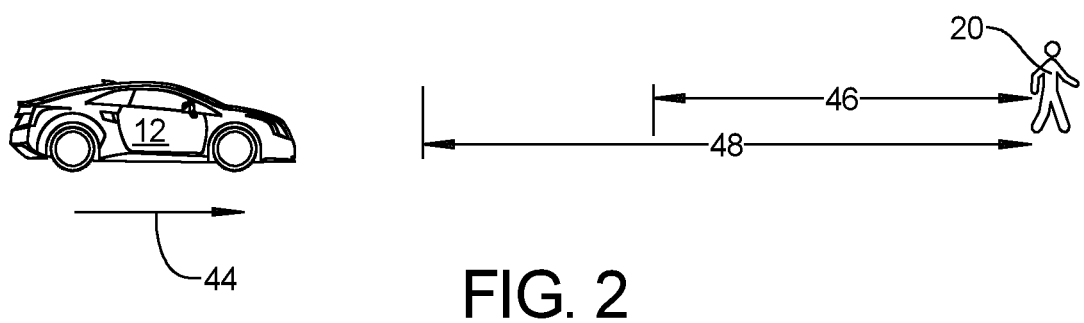
FIG. 2 is a schematic diagram illustrating the application of a standard time to collision threshold and a modified time to collision threshold.

Referring to FIG. 2, as the automobile 12 approaches the object 20 (pedestrian), as indicated by arrow 44, the standard time to collision threshold would cause the collision avoidance system 14 to take action 6 seconds (calculated based on distance and speed of the automobile 12) before the automobile 12 will reach the object 20. That means the collision avoidance system 14 will take action at a first distance 46 from the object 20. When the data processor determines low light conditions exist, such as 80 lumens, from the example above, the modified time to collision threshold is 7.2 seconds, and the collision avoidance system 14 will take action at a second distance 48, that is greater than the first distance 46, from the object, giving the driver an extra 1.2 seconds to identify and react to the object 20.

In another exemplary embodiment, the data processor 16 is adapted to determine a color of the object 20, and, when modifying the time to collision threshold, to determine, by accessing a third look-up table within the data processor, a color coefficient. Determination by the data processor 16 that the ambient lighting levels are at low light conditions, means that a driver of the automobile 12 will have more difficulty seeing an object 20 in front of the automobile 12. As discussed above, the driver's ability to see the object can be significantly impacted by the color of an object, such as the clothing of a pedestrian. To accommodate for this, and give the driver of the automobile 12 more time to safely identify and react to the object 20 in front of the automobile 12, a color coefficient along with the lighting coefficient is applied to the standard time to collision threshold. The third look-up table is a table of color coefficient values that are pre-determined through experimentation and stored within the data processor 16. After looking up the color coefficient, the data processor 16 calculates a modified time to collision threshold and sends the modified time to collision threshold to the collision avoidance system 14.

For instance, if the ambient light level threshold is 100 lumens, and the data processor 16 determines that the ambient light level at the object 20 is 80 lumens, then the data processor will determine that low light levels exist, and determine that the lighting coefficient is 1.2. If, upon analysis, the data processor determines that the color of the object is yellow, accessing the third look-up table, based on the object being yellow, the third look-up table provides a color coefficient that is 1.5. If the standard time to collision threshold is 6 seconds, then in normal daylight conditions, the collision avoidance system 14 will take action (provide alerts or take autonomous actions) when the automobile 12 is 6 seconds from the object 20. If low light levels exist, the driver will need more time to see and react to the object 20, so the standard time to collision threshold is modified by multiplying the standard time to collision threshold by the lighting coefficient and the color coefficient. Thus, the modified time to collision threshold is 1.2 (lighting coefficient)×1.5 (color coefficient)×6 (standard time to collision threshold)=10.8 seconds (modified time to collision threshold, and the collision avoidance system 14 will take action (provide alerts or take autonomous actions) when the vehicle is 10.8 seconds from the object 20. If the color of the object is blue, which is much darker and harder to see than yellow), the third look-up table will provide a color coefficient based on the darker color (blue), for example 1.8. The darker color of the object means that the driver will need even more time to identify and react to an object 20 in front of the automobile 12. Thus, the modified time to collision threshold is 1.2 (lighting coefficient)×1.8 (color coefficient)×6 (standard time to collision threshold)=13 seconds (modified time to collision threshold, and the collision avoidance system 14 will take action (provide alerts or take autonomous actions) when the vehicle is 13 seconds from the object 20.

During operation of the automobile 12, the data processor 16 is adapted to receive data related to objects within the path of the automobile 12 and to modify the standard time to collision threshold based on the data related to the object 20 within the path of the automobile 12 continuously at a pre-determined time interval, to ensure that modifications, when necessary, to the standard time to collision threshold are continuously updated as conditions change. In an exemplary embodiment, the process will be repeated 10-20 times per second.

Figure 3:
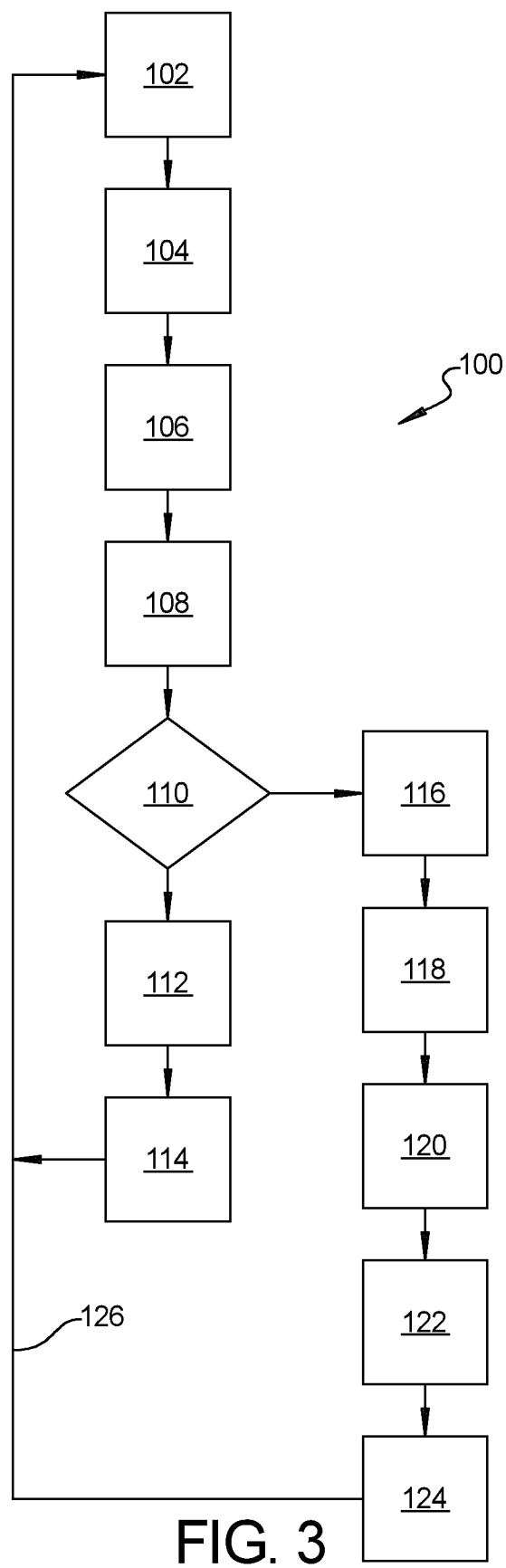
FIG. 3 is a flowchart illustrating a method according to an exemplary embodiment of the present disclosure.

Referring to FIG. 3, a flow chart illustrates a method 100 of modifying a time to collision threshold within a collision avoidance system 14 of an automobile 12 in accordance with the present disclosure.

Beginning at block 102, the method 100 includes receiving, with a data processor 16, via a communication bus 18 within the automobile 12, data and images related to an object 20 within a path of the automobile 12 from at least one image capturing device 40 and at least one non-visual sensor 42 positioned within the automobile.

Moving to block 104, the method 100 includes receiving, with the data processor 16, via a wireless communication module 22, data and images related to an object 20 within a path of the automobile 12 from infrastructure cameras 30 positioned along a path of the automobile 12 and image capturing devices 34 mounted within other automobiles 36.

Moving to block 106, the method 100 includes determining, with the data processor 16, ambient light levels within the images of the object 20, and, moving to block 108, determining, with the data processor 16, a color of the object 20.

Moving to block 110, the method includes comparing, with the data processor 16, the ambient light levels within the images of the object 20 to a pre-determined ambient light level threshold.

Moving from block 110 to block 112, when the ambient light levels within the image of the object 20 are at least the pre-determined ambient light level, then the method includes, moving to block 112, determining, with the data processor 16, via a first look up table, a standard time to collision threshold, and, moving to block 114, sending, with the data processor 16, via the communication bus 18 within the automobile 12, the standard time to collision threshold to the collision avoidance system 14.

Moving from block 110 to block 116, when the ambient light levels within the images of the object 20 are less than the pre-determined ambient light level threshold, then the method includes, moving to block 116, determining, with the data processor 16, via the first look up table, a standard time to collision threshold, moving to block 118, determining, with the data processor 16, via the second look-up table, a lighting coefficient, and, moving to block 120, determining, with the data processor 16, via the third look-up table, a color coefficient.

Moving to block 122, the method includes applying, with the data processor, the lighting coefficient and the color coefficient to the standard time to collision threshold and calculating a modified time to collision threshold, and moving to block 124, sending, with the data processor 16, via the communication bus 18 within the automobile 12, the modified time to collision threshold to the collision avoidance system 14.

During operation of the automobile 12, the data processor 16 is adapted to repeat the steps recited in blocks 102-124 and to modify the standard time to collision threshold continuously at a pre-determined time interval, to ensure that modifications, when necessary, to the standard time to collision threshold are continuously updated as conditions change. Referring to the line 126, the method includes continuously repeating the steps recited in blocks 102-124 are repeated 10-20 times per second.

A system 10 and method 100 of the present disclosure offers the advantage of automatically adjusting the standard time to collision threshold used by a collision avoidance system 14 in real-time based on ambient light conditions and the color of an object 20 detected in front of an automobile 12 to ensure that the collision avoidance system 14 takes action to provide a driver sufficient time to identify and react to the object 20 in front of the automobile 12.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of modifying a time to collision threshold within a collision avoidance system of an automobile, comprising:
    receiving, with a data processor, images of an object within a path of the automobile;
    determining, with the data processor, ambient light levels within the images of the object;
    comparing, with the data processor, the ambient light levels within the images of the object to a pre-determined ambient light level threshold;
    modifying a standard time to collision threshold based on the ambient light levels within the images of the object within the path of the automobile;
    determining, with a collision avoidance system, when collision with the object is imminent based on the modified standard time to collision threshold; and
    when collision with the object is imminent, one of:
        alerting, with the collision avoidance system, a driver of the vehicle; or
        taking, via communication with a vehicle controller, autonomous action to avoid a collision with the object.

2. The method of claim 1, wherein the receiving, with a data processor, images of an object within a path of the automobile further includes receiving, with the data processor, via a wireless communication module, images of an object within a path of the automobile from external image capturing devices.

3. The method of claim 2, wherein the external image capturing devices includes infrastructure cameras positioned along a path of the automobile.

4. The method of claim 2, wherein the external image capturing devices includes image capturing devices mounted within other automobiles.

5. The method of claim 1, wherein the receiving, with a data processor, images of an object within a path of the automobile further includes receiving, with the data processor, via a communication bus within the automobile, data related to an object within a path of the automobile from a plurality of sensors positioned within the automobile.

6. The method of claim 5, wherein the plurality of sensors positioned within the automobile includes at least one image capturing device and at least one non-visual sensor.

7. The method of claim 1,
    wherein, when the ambient light levels within the image of the object are at least the pre-determined ambient light level, the modifying the time to collision threshold based on the ambient light levels within the images of the object within the path of the automobile further includes:
        determining, with the data processor, via a first look up table within the data processor, the standard time to collision threshold; and
        sending, with the data processor, via a communication bus within the automobile, the standard time to collision threshold to the collision avoidance system.

8. The method of claim 1,
    wherein, the modifying the time to collision threshold based on the ambient light levels within the images of the object within the path of the automobile further includes modifying the standard time to collision threshold when the ambient light levels within the images of the object are less than the pre-determined ambient light level threshold.

9. The method of claim 8, wherein the modifying the time to collision threshold further includes:
    determining, with the data processor, via a first look up table within the data processor, a standard time to collision threshold;
    determining, with the data processor, via a second look-up table within the data processor, a lighting coefficient;
    applying, with the data processor, the lighting coefficient to the standard time to collision threshold and calculating a modified time to collision threshold; and
    sending, with the data processor, via a communication bus within the automobile, the modified time to collision threshold to the collision avoidance system.

10. The method of claim 8, further including determining, with the data processor, a color of the object, wherein the modifying the time to collision threshold further includes:
    determining, with the data processor, via a first look up table within the data processor, a standard time to collision threshold;
    determining, with the data processor, via a second look-up table within the data processor, a lighting coefficient;
    determining, with the data processor, via a third look-up table within the data processor, a color coefficient;
    applying, with the data processor, the lighting coefficient and the color coefficient to the standard time to collision threshold and calculating a modified time to collision threshold; and
    sending, with the data processor, via a communication bus within the automobile, the modified time to collision threshold to the collision avoidance system.

11. The method of claim 1, wherein the receiving, with the data processor, images of the object within the path of the automobile, and the modifying the time to collision threshold based on the ambient light levels within the images of the object within the path of the automobile are repeated at a pre-determined time interval.

12. A method of modifying a time to collision threshold within a collision avoidance system of an automobile, comprising:
    receiving, with a data processor, via a communication bus within the automobile, data and images related to an object within a path of the automobile from at least one image capturing device and at least one non-visual sensor positioned within the automobile;
    receiving, with the data processor, via a wireless communication module, data and images related to an object within a path of the automobile from infrastructure cameras positioned along a path of the automobile and image capturing devices mounted within other automobiles;

determining, with the data processor, ambient light levels within the images of the object;

determining, with the data processor, a color of the object;

comparing, with the data processor, the ambient light levels within the images of the object to a pre-determined ambient light level threshold; and when the ambient light levels within the image of the object are at least the pre-determined ambient light level threshold:
  determining, with the data processor, via a first look up table, a standard time to collision threshold; and
  sending, with the data processor, via a communication bus within the automobile, the standard time to collision threshold to the collision avoidance system; and when the ambient light levels within the images of the object are less than the pre-determined ambient light level threshold:
  determining, with the data processor, via a first look up table, a standard time to collision threshold;
  determining, with the data processor, via a second look-up table, a lighting coefficient;
  determining, with the data processor, via a third look-up table, a color coefficient;
  applying, with the data processor, the lighting coefficient and the color coefficient to the standard time to collision threshold and calculating a modified time to collision threshold;
  sending, with the data processor, via a communication bus within the automobile, the modified time to collision threshold to the collision avoidance system;
  determining, with the collision avoidance system, when collision with the object is imminent based on the modified time to collision threshold; and when collision with the object is imminent, one of:
    alerting, with the collision avoidance system, a driver of the vehicle; or
    taking, via communication with a vehicle controller, autonomous action to avoid a collision with the object.

13. A system within an automobile adapted to modify a time to collision threshold within a collision avoidance system, comprising a data processor in communication, via a communication bus, with a collision avoidance system, the data processor adapted to:
  receive images of an object within a path of the automobile;
  determine ambient light levels within the images of the object;
  compare the ambient light levels within the images of the object to a pre-determined ambient light level threshold;
  modify a time to collision threshold based on the ambient light levels within the images of the object within the path of the automobile; and
  send the modified time to collision threshold to the collision avoidance system;
  wherein, the collision avoidance system is adapted to determine when collision with the object is imminent based on the modified time to collision threshold; and when collision with the object is imminent, one of:
    alert a driver of the vehicle; or
    take, via communication with a vehicle controller, autonomous action to avoid a collision with the object.

14. The system of claim 13, further including a wireless communication module, the data processor further adapted to receive, via the wireless communication module, images of an object within a path of the automobile from infrastructure cameras positioned along a path of the automobile and image capturing devices mounted within other automobiles.

15. The system of claim 13, further including at least one image capturing device and at least one non-visual sensor mounted within the automobile and in communication with the data processor via the communication bus, wherein the data processor is adapted to receive, via the communication bus, data and images related to an object within a path of the automobile from the at least one image capturing device and the at least one non-visual sensor.

16. The system of claim 13, wherein
  when the ambient light levels within the image of the object are at least the pre-determined ambient light level threshold, the data processor is further adapted to:
    determine, by accessing a first look up table, a standard time to collision threshold; and
    send, via the communication bus, the standard time to collision threshold to the collision avoidance system.

17. The system of claim 13, wherein
  when the ambient light levels within the images of the object are less than the pre-determined ambient light level threshold, modify the time to collision threshold based on the data related to the object within the path of the automobile.

18. The system of claim 17, wherein, when modifying the time to collision threshold, the data processor is further adapted to:
  determine, by accessing a first look up table within the data processor, a standard time to collision threshold;
  determine, by accessing a second look-up table within the data processor, a lighting coefficient;
  apply the lighting coefficient to the standard time to collision threshold and calculate a modified time to collision threshold; and
  send, via the communication bus, the modified time to collision threshold to the collision avoidance system.

19. The system of claim 17, wherein the data processor is further adapted to determine a color of the object; and, when modifying the time to collision threshold, to:
  determine, by accessing a first look up table within the data processor, a standard time to collision threshold;
  determine, by accessing a second look-up table within the data processor, a lighting coefficient;
  determine, by accessing a third look-up table within the data processor, a color coefficient;
  apply the lighting coefficient and the color coefficient to the standard time to collision threshold and calculate a modified time to collision threshold; and
  send, via the communication bus, the modified time to collision threshold to the collision avoidance system.

20. The system of claim 13, wherein the data processor is further adapted to receive images of an object within a path of the automobile and to modify a time to collision threshold based on the images of the object within the path of the automobile repeatedly at a pre-determined time interval.

* * * * *